(12) United States Patent
Tappan et al.

(10) Patent No.: US 11,960,908 B2
(45) Date of Patent: Apr. 16, 2024

(54) INDUSTRIAL ASSET MANAGEMENT

(71) Applicant: Baker Hughes Holdings LLC, Houston, TX (US)

(72) Inventors: Jacqueline Tappan, Minden, NV (US); Eric Gilchrist, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 17/507,392

(22) Filed: Oct. 21, 2021

(65) Prior Publication Data

US 2023/0131574 A1  Apr. 27, 2023

(51) Int. Cl.
*G06F 3/0482* (2013.01)
*G06F 9/451* (2018.01)

(52) U.S. Cl.
CPC .................................. *G06F 9/451* (2018.02)

(58) Field of Classification Search
CPC ... G06F 39/451; G06F 3/0482; G06F 3/04847
See application file for complete search history.

(56) References Cited

U.S. PATENT DOCUMENTS

| | | | | |
|---|---|---|---|---|
| 8,370,224 B2 * | 2/2013 | Grewal | ................. | G06F 3/0482 705/29 |
| 10,838,583 B2 * | 11/2020 | Tappan | ................. | G06F 3/0482 |
| 11,451,610 B1 * | 9/2022 | Saunders | ............ | H04L 41/0246 |
| 2007/0240071 A1 * | 10/2007 | Sherrill | .............. | G05B 23/0267 715/764 |
| 2010/0271479 A1 * | 10/2010 | Heydlauf | ................. | H04N 7/18 715/830 |
| 2015/0356520 A1 * | 12/2015 | Mitti | .................... | G06Q 10/087 705/305 |
| 2021/0097149 A1 * | 4/2021 | Stump | ..................... | G06N 5/045 |
| 2022/0027529 A1 * | 1/2022 | Zarur | ...................... | G06F 30/12 |

* cited by examiner

*Primary Examiner* — Mahelet Shiberou
(74) *Attorney, Agent, or Firm* — Mintz, Levin, Cohn, Ferris, Glovsky and Popeo, P.C.

(57) ABSTRACT

In some aspect, a method includes receiving data characterizing user selection of a industrial machine via a web-based graphical user interface (GUI) associated with an industrial enterprise including a plurality of industrial machines. The web-based GUI includes a first portion and a second portion. The first portion includes a first interactive graphical object indicative of a industrial machine of the plurality of industrial machines. The method also includes retrieving the data associated with the industrial machine from a first monitoring system configured to monitor the industrial machine. The method further includes generating a first visual representation of the data associated with the industrial machine. Generating the first visual representation is based on a first visual framework associated with a first identifier characteristic of the industrial machine. The method also includes displaying, in the second portion of the web-based GUI, the first visual representation.

19 Claims, 4 Drawing Sheets ental injury to workers. Given these risks, it can be common to monitor certain operating parameters of one or more machine components. Measurements of the operating parameters can provide an indication of the mechanical condition of a machine component, allowing preventative maintenance (e.g., repair, replacement, etc.) to be performed on the machine component prior to failure. This condition monitoring can provide one or more long term benefits, such as lower production costs, reduced equipment down time, improved reliability, and enhanced safety.

INDUSTRIAL ASSET MANAGEMENT

BACKGROUND

Many process-intensive industries, such as hydrocarbon refining and power generation, can rely heavily upon operation of machinery, and in some instances, continuous operation of machinery. In these environments, failure of one or more machines can incur significant costs due to repair expenses as well as loss of production and potential injury to workers. Given these risks, it can be common to monitor certain operating parameters of one or more machine components. Measurements of the operating parameters can provide an indication of the mechanical condition of a machine component, allowing preventative maintenance (e.g., repair, replacement, etc.) to be performed on the machine component prior to failure. This condition monitoring can provide one or more long term benefits, such as lower production costs, reduced equipment down time, improved reliability, and enhanced safety.

SUMMARY

In some aspect, a method includes receiving data characterizing user selection of a industrial machine via a web-based graphical user interface (GUI) associated with an industrial enterprise including a plurality of industrial machines. The web-based GUI includes a first portion and a second portion. The first portion includes a first interactive graphical object indicative of a industrial machine of the plurality of industrial machines. The method also includes retrieving the data associated with the industrial machine from a first monitoring system configured to monitor the industrial machine. The method further includes generating a first visual representation of the data associated with the industrial machine. Generating the first visual representation is based on a first visual framework associated with a first identifier characteristic of the industrial machine. The method also includes displaying, in the second portion of the web-based GUI, the first visual representation.

One or more of the following features can be included in any feasible combination.

In some implementations, the method further includes selecting the first visual framework from a plurality of visual frameworks based on the first identifier characteristic. Each visual framework of the plurality of visual frameworks is associated with an identifier characteristic. In some implementations, the second portion of the web-based GUI includes a plurality of visualizations associated with a plurality of components of the industrial machine. The plurality of visualizations are arranged at predetermined locations. In some implementations, a first visualization and a first location of the first visualization in the second portion of the web-based GUI is included in the first visual framework. The plurality of visualizations includes the first visualization and the plurality of locations includes the first location.

In some implementations, the second portion of the web-based GUI further includes a first graphical object including a first identifier associated with the first component and/or a second graphical object including a first sensor measurement associated with the first component. A second location of the first graphical object and/or the third location of the second graphical object is included in the first visual framework. In some implementations, the method further includes receiving an update to the data associated with the industrial machine. The data associated with the industrial machine is updated via a first GUI associated with the first monitoring system. The method also includes updating the second portion of the web-based GUI based on the received update. In some implementations, the web-based graphical user interface (GUI) is generated by an enterprise monitoring system configured to communicate with the first monitoring system.

DESCRIPTION OF DRAWINGS

These and other features will be more readily understood from the following detailed description taken in conjunction with the accompanying drawings, in which.

Figure 1:
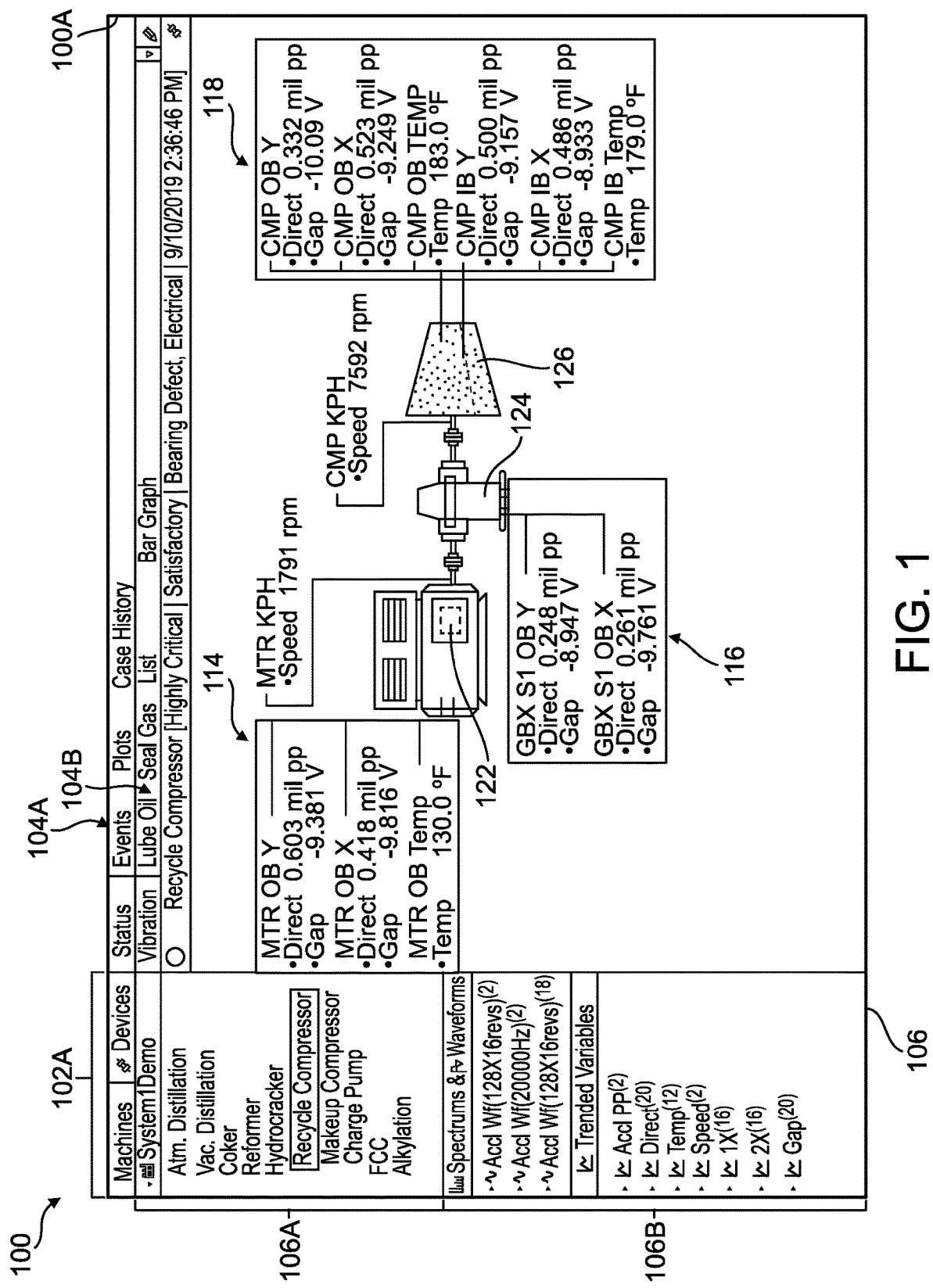
FIG. 1 is a schematic representation of an exemplary embodiment of a GUI of a monitoring system associated with industrial machines at an industrial site.

It is noted that the drawings are not necessarily to scale. The drawings are intended to depict only typical aspects of the subject matter disclosed herein, and therefore should not be considered as limiting the scope of the disclosure.

DETAILED DESCRIPTION

Industrial machines can be monitored by monitoring systems to ensure operation within acceptable tolerances. In general, machine monitoring can include measuring operating parameters of one or more of the machine components by sensors, determining whether the machine components are operating properly from the operating parameter measurements, and issuing warnings if a machine component is determined to be operating improperly. These warnings can allow corrective action to be taken in advance of machine failure, providing benefits such as lower production costs, reduced equipment down time, improved reliability, and/or improved safety.

An industrial enterprise can include multiple industrial machines that can be distributed over multiple industrial sites that can be geographically separated (e.g., across the globe). In existing industrial enterprise, each industrial site can include a monitoring system configured to monitor the industrial machines at the industrial site. The monitoring system can include a graphical user interface (GUI) that can include a visual representation of an industrial machine being monitored at the industrial site. For example, the visual representation can include visualizations of various components of the industrial machine and the interconnections among the components. The GUI can also include graphical objects that include component identifiers (e.g., names, predetermined component ID, etc.) that can be used to identify the visualizations. In some implementations, the GUI can include graphical objects that include data entries (e.g., sensor measurements) associated with the various components.

Different industrial sites can have different monitoring systems with different GUIs. For example an industrial machine can have different visual representations in different GUIs (e.g., components of the industrial machine can be represented by different visualizations, the arrangements of the visualizations/graphical objects in the GUI may be different, etc.). As a result, a user (e.g., a technician) working at a first industrial site may find it challenging to work on a visual representation of the same machine at a second industrial site (e.g., collaborate with a user at the second industrial site). Therefore, it is desirable to generate a GUI that has the same visual representations of an industrial machine irrespective of the industrial site (or geographical location) at which the industrial machine is located. In some implementations of the current subject matter, a web-based graphical user interface is provided the can retrieve information associated with an industrial machine (e.g., from the monitoring system of the industrial site where the industrial machine is located) and present the retrieved information using a predetermined visual framework (associated with the industrial machine) in the web-based GUI. In some implementations, each industrial machine can have a unique visual framework that does the web-based GUI can be accessed via a web browser that can be updated based on updated information (e.g., updated operating parameters) of the industrial machine.

FIG. 1 is a schematic representation of an exemplary embodiment of a GUI 100 of a monitoring system associated with industrial machines at an industrial site. The GUI 100 includes a first portion 100A and a second portion 100B. The first GUI portion 100A includes user selectable options, while the second GUI portion 100B is updated to display visual representation of the industrial machine corresponding to option selected within the first GUI portion 100A. As shown, the first GUI portion 100A includes a selection option 102, primary display options 104A, secondary display options 104B, and a plurality of view spaces 106 having content that can dynamically change in response to the industrial machine selected via the selection option 102. As shown, the selection option 102 can include industrial machines and condition monitoring devices (e.g., physical monitors) at the industrial site.

The primary display options 104A can include status, events, plots, and case history associated with the industrial machine or device selected from the selection option 102. Status can include a condition of the selected industrial machine based upon one or more measurements acquired by the sensors or received by a third party system (e.g., Satisfactory, Unsatisfactory, Warning, Alarm, etc.) Events can be alarm or system logs that alert the user to potential component health issues (e.g., a measured parameter or exceeding a threshold value). Plots can include any graphical representation of measured data. The case history can include plots of historical data and historical reports. The secondary display options 104B can include sub-types of displays views based upon the selection option 102 and primary display option 104A. Examples of display sub-types can include a type of defined charting view (e.g. vibration, surge curve) and/or a type of display (e.g., list, bar graph, etc.).

The dynamic view space 106 can include information associated with the industrial machine selected via the selection option 102. The information can include hierarchical information displayed in a hierarchical view space 106A of the dynamic view space 106. The hierarchical information can include a first level associated with the site of the industrial machine, a second level associated with the process system associated with the industrial machine, a third level indicative of the type of machine, etc. The information can include operating parameters derived from measurements acquired from sensors (e.g., acceleration, temperature, speed, displacement, gap distance, etc.) associated with the selected machine. The operating parameter can be displayed in measurement view space 106B of the dynamic view space 106. Under circumstances where operating parameters are displayed in the second GUI portion 100B (e.g., a plot), the displayed operating parameter can be selected from the measurement view space 106B.

The GUI 100 of FIG. 1 illustrates a visual representation in the second GUI portion 100B corresponding to selection of a machine (e.g., a recycle compressor) from the plurality of machines in the component options 102, a view selected from the primary display options 104A, and a view list selected from the secondary display options 104B. The visual representation of the selected machine can include visualizations of the components of the selected machine. For example the visual representation of a recycle compressor can include a first visualization 122 of a motor of the recycle compressor, a second visualization 124 of a gearbox of the recycle compressor and a third visualization 126 of the compressor of the recycle compressor. The second GUI portion 100B can include an identifier (e.g., name) associated with the various components of the selected industrial machine and one or more data fields. For example, the second GUI portion 100B can include graphical objects 114 that display data entries 116 associated with a respective machine component. The data entries 116 can include operational parameters such as real-time measurement data (e.g., operating state of the machine, status indication, speed, etc.) received from various sensors 18 disposed on a respective machine component 112, outputs of analyses performed by the processor based upon measurement data received from various sensors disposed on a respective machine component, or the like. GUI 100 further updates the measurement view space 106B to display operational parameters (e.g., acceleration, temperature, speed, displacement, gap distance, etc.) associated with a selected machine component.

Figure 2:
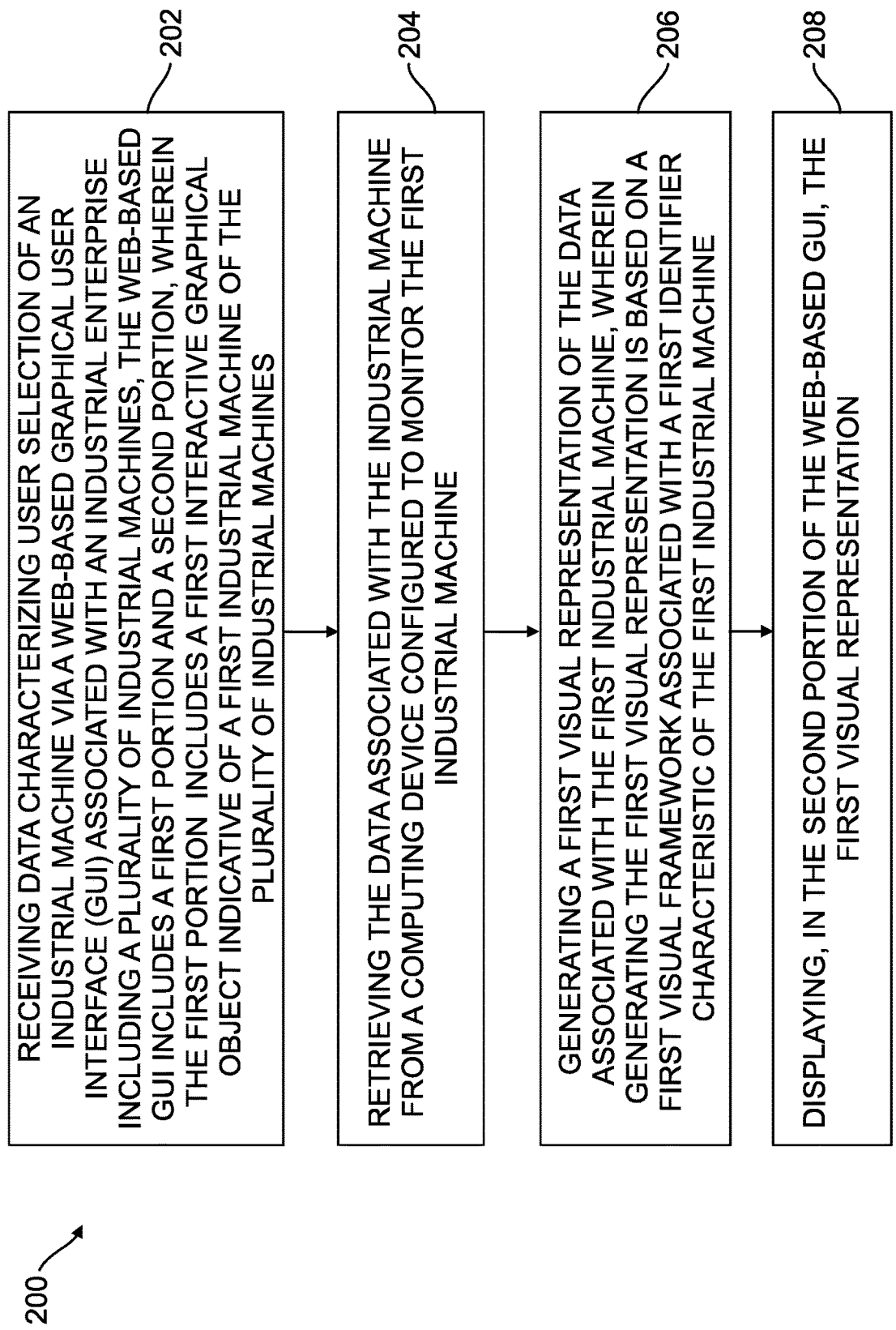
FIG. 2 is a flowchart of an exemplary method of generating a visual representation of an industrial machine in a web-based graphical user interface.
Figure 3:
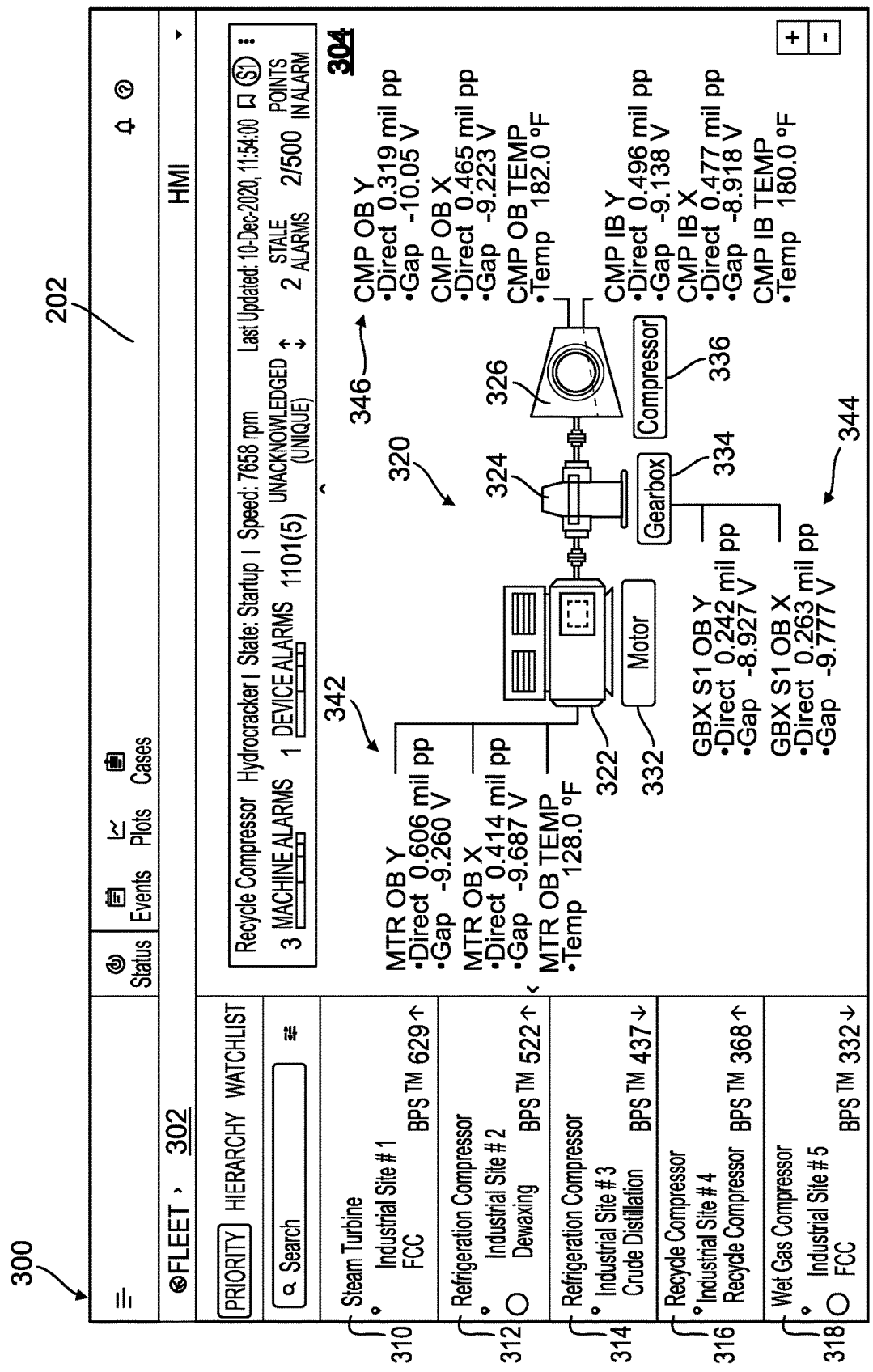
FIG. 3 illustrates an exemplary web-based graphical user interface of FIG. 2.

FIG. 2 is a flowchart 200 of an exemplary method of generating a visual representation of an industrial machine in a web-based graphical user interface. At step 202, data characterizing user selection of an industrial machine is received via a web-based graphical user interface (GUI). The web-based GUI can be associated with an industrial enterprise including a plurality of industrial machines that can be located at multiple industrial sites (e.g., located at multiple geographical locations). FIG. 3 illustrates an exemplary web-based GUI 300. The web-based GUI includes a first portion 302 and a second portion 304. The first portion 302 can include multiple interactive graphical objects 310-318. Each graphical object can represent an industrial machine at an industrial site of the industrial enterprise. For example, graphical object 310 represents a fluid catalytic cracker located at a first industrial site, graphical object 312 represents a dewaxing machine located at a second industrial site, graphical object 314 represents a crude distillation unit located at a third industrial site, graphical object 316 represents a recycle compressor located at a fourth industrial site, and graphical object 318 represents a fluid catalytic cracker located at a fifth industrial site. An industrial machine can be selected by interacting with the corresponding graphical object (e.g., a user can click on the graphical object). For example, a user can select the recycle compressor at the fourth industrial site by clicking on the graphical object 316.

Figure 4:
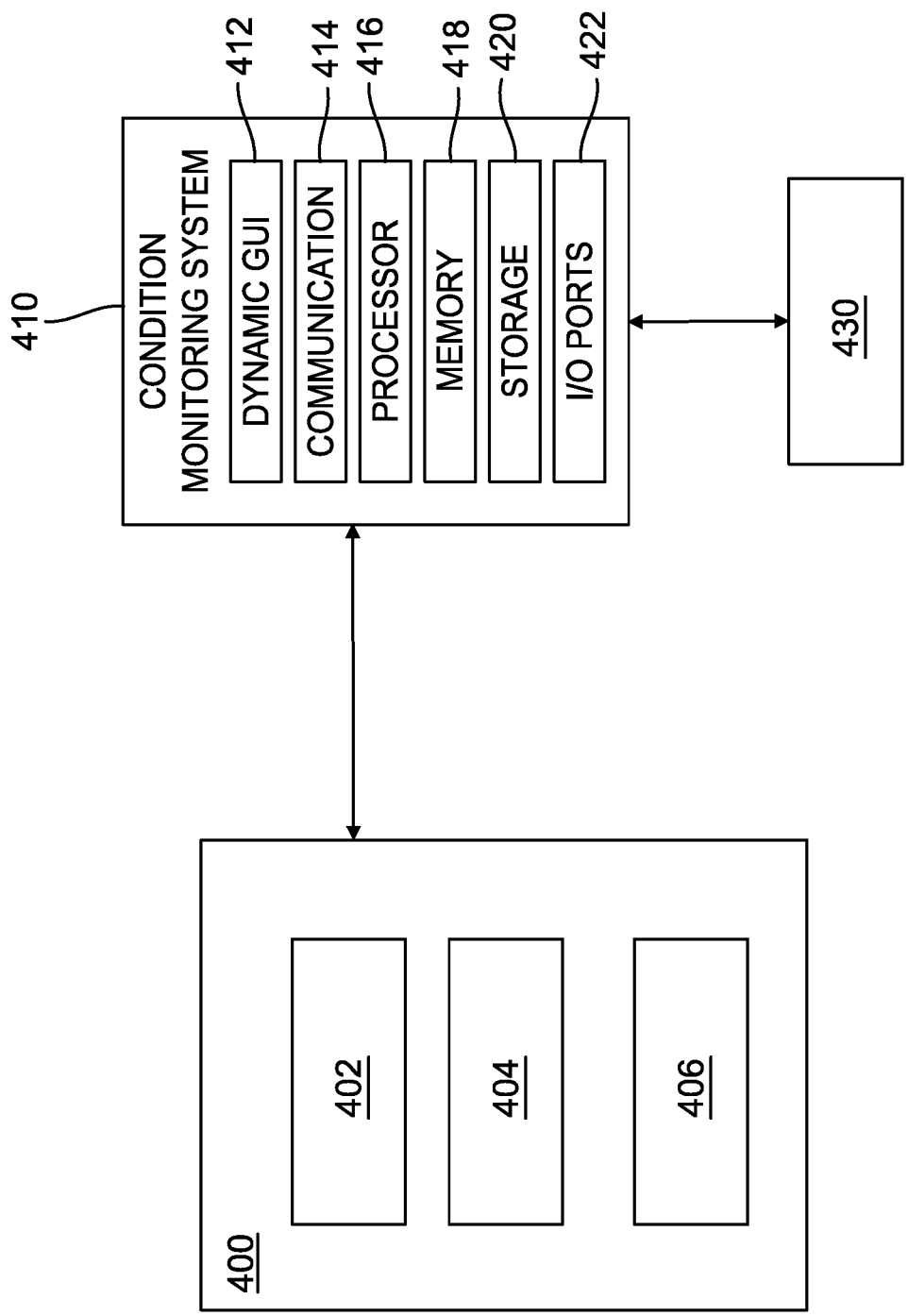
FIG. 4 illustrates an exemplary enterprise monitoring system.

FIG. 4 illustrates an exemplary enterprise monitoring system 400 of the industrial enterprise. The enterprise monitoring 400 can include a processor 402 and a data storage 404 (e.g., a server, memory, etc.). The enterprise monitoring system 400 can generate the web-based GUI 406 that can be presented to a user via a display device (e.g., display device of a user computing system communicatively coupled to the enterprise monitoring system 400 via the world wide web).

The enterprise monitoring system 400 can communicate with multiple condition monitoring systems associated with different industrial sites. For example, a condition monitoring system 410 configured to monitor the industrial machine 430 can be communicatively coupled to the enterprise monitoring system 400.

The condition monitoring system 410 can include components configured to display data, process data, and analyze data. As shown, the condition monitoring system 410 includes a communication component 414, a processor 416, a memory 418, a data storage 420, input/output (I/O) ports 422, and the like. The communication component 414 can be a wireless or wired communication component that facilitates communication between the condition monitoring system 420 and the enterprise monitoring system 400, sensors coupled to the industrial machine, 430, other monitoring systems, and the like. The processor 416 can be any type of computer processor or microprocessor capable of executing computer-executable code. The memory 418 and the data storage 420 can be any suitable articles of manufacture that can serve as media to store processor-executable code, data, or the like. The processor 416 can be configured to generate graphical user interface (GUI) 412 configured for display upon a display device. The GUI 412 can include visualizations that represent the industrial machines/sensors in the industrial site being monitored by the condition monitoring system 410. As such, users of the condition monitoring system 410 may monitor the health or status of machines in the industrial site (e.g., industrial machine 430) via the GUI 412 (e.g., GUI 100 of the condition monitoring system).

At step 204, data associated with the industrial machine selected at step 202 can be retrieved (e.g., by the enterprise monitoring system 400 from the condition monitoring system 410 configured to monitor the industrial machine 430). Data associated with the industrial machine 430 (e.g. recycle compressor selected via graphical object 316) can be stored in the data storage 420 (e.g., in a database in the data storage 420) of the monitoring system 410. In some implementations, the monitoring system 410 can receive a request (e.g., from the enterprise monitoring system 400) for data of the industrial machine 430. The request can include an identifier (e.g., industrial machine name, industrial machine ID number, etc.) associated with the industrial machine 430. Based on the identifier, the monitoring system 410 can identify the data associated with the industrial machine 430 from the database and transmit the data (e.g., to the enterprise monitoring system 400). The retrieved data can include sensor data detected by the sensors operatively coupled to the industrial machine 430, an identifier (e.g., name, machine type, etc.) associated with the industrial machine, identities of components of the industrial machine, etc.

At step 206, a visual representation of the data associated with the industrial machine is generated (e.g., by the enterprise monitoring system 400). The web-based GUI 300 can include a second portion 304 where a visual representation 320 of the industrial machine selected at step 202 can be presented. For example, based on the selection of the industrial machine via a graphical object in the web-based GUI (e.g., selection of graphical object 316 at step 202), data associated with the industrial machine (e.g., recycle compressor) is retrieved (e.g., step 204) from the monitoring system 420 configured to monitor the industrial machine (e.g., recycle compressor), and a visual representation 320 of the industrial machine (e.g., recycle compressor) is provided in the second portion 304.

The visual representation is based on a visual framework of the industrial machine selected at step 202. The visual framework of the industrial machine can include data and instructions based on which the visual representation of the industrial machine is generated. For example, the visual framework can include visualizations (or graphical images) of the various components of the industrial machine (e.g., motor, gearbox, compressor, etc., of the recycle compressor). In some implementations, the data storage 404 of the enterprise monitoring system 400 can include a plurality of visual frameworks. In some implementations, each visual framework of the plurality of visual framework is associated with an industrial machine (e.g., a unique industrial machine). A visual framework associated with an industrial machine can be identified based on an identifier characteristic of the industrial machine. The enterprise monitoring system can select a visual framework from the plurality of visual frameworks based on the identifier characteristic of the industrial machine (e.g., name of the industrial machine, ID of the industrial machine, etc.).

The visual framework can include information related to arrangement of the various components of the web-based graphical user interface. For example, the visual framework can include locations of the various visualizations of the components of the industrial machine in the web-based GUI. The visual framework can also include location of graphical objects that include identifiers of the various components (e.g., name of the components) in the web-based GUI. In some implementations, the visual frameworks can include locations of graphical objects that include data associated with the components of the industrial system. In some implementations, sensor data associated with the various components of the industrial machine can be identified in the data of the industrial machine retrieved at step 204 and displayed in predetermined graphical objects (e.g., whose location has been predetermined) in the web-based GUI 300.

At step 208, the visual representation can be presented in the second portion 304 of the web-based GUI 300. The plurality of visualizations are arranged at predetermined locations in the second portion 304 of the web-based GUI 300. For example, the first visualization 322 of the motor is located at a first location, the second visualization 324 of the gearbox is located at a second location, and the third visualization 326 of the compressor is located at a third location in the web-based GUI. Together, the first, the second and the third visualization constitute the visual representation 320 of the recycle compressor. The second portion 304 can include a first graphical object 332, second graphical object 334, and third graphical object 336 associated with the first component 322, the second component 324 and the third component 326, respectively. The first graphical object 332, the second graphical object 334, and the third graphical object 336 includes the first identifier of the first component (e.g., name of the first component), the second identifier of the second component (e.g., name of the second component), and the third identifier of the third component (e.g., name of the third component), respectively.

The second portion 304 further includes a fourth graphical object 342 that includes data associated with the first component 322, a fifth graphical object 344 that includes data associated with the second component 322, and a sixth graphical object 346 that includes data associated with the third component 326. For example, as illustrated in FIG. 3, the fourth, the fifth and the sixth graphical objects can include sensor data associated with the corresponding components of the recycle compressor.

As discuss above, the appearance and locations of the various visualizations and the graphical objects can be determined based on the visual framework associated with the industrial machine (e.g., visual framework of the recycle compressor). Each time a given industrial machine is selected via the web-based GUI (e.g., by a user via the first portion 302 of the web-based GUI 300), the second portion 304 of the web-based GUI is generated using data retrieved from the condition monitoring system associated with the selected industrial machine. The generation of the second portion 304 is based on the visual framework (e.g., stored in storage 404 of the enterprise monitoring system) of the selected machine. This can result in a standard view of the second portion 304 (e.g., visual representation 320, locations of the various graphical object, etc.) when the given industrial machine is selected. For example, recycle compressors located at different industrial sites can be represented by the same visual representation (e.g., same visualizations of the components of the recycle compressor). This can facilitate seamless collaboration between users at different industrial sites (that have different monitoring system) via the web-based GUI.

In some implementations, the second portion 304 of the web-based can be updated to reflect new information associated with the industrial machine. For example, the conditioning monitoring system 410 can detect/determine updated information (e.g., operating parameters, operating status, alarm-level, etc.) associated with the industrial machine 430. The updated operating information can be provided by the condition monitoring system 410 to the enterprise monitoring system 400. The enterprise monitoring system can receive the update to the data associated with the industrial machine. Based on the updated data, the enterprise monitoring system can update the second portion 304 of the web-based GUI (e.g., in real-time). For example, if a new operating parameter associated with a component of the industrial device is detected, the graphical object (e.g. fourth graphical object 342, fifth graphical object 344, sixth graphical object 346, etc.) corresponding to the component can be updated. This can allow the user(s) of the web-based GUI 300 to operate (e.g., respond to an alarm) based on the most recent data associated with the industrial machine.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such w-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method comprising:
receiving data characterizing a first user selection of a first interactive graphical object associated with a first mechanical industrial machine at a first industrial site, the first interactive graphical object selected from a first plurality of interactive graphical objects associated with a plurality of mechanical industrial machines at the first industrial site, the first plurality of interactive graphical objects provided via a first portion of a web-based graphical user interface (GUI);
retrieving first monitoring data associated with the first mechanical industrial machine from a first monitoring system configured to monitor the first mechanical industrial machine, wherein the first monitoring data comprises first device data associated with at least one first device of the first mechanical industrial machine;
generating a first visual representation of the first mechanical industrial machine in the second portion of the web-based GUI, wherein the first visual representation includes the at least one first device of the first mechanical industrial machine and the first monitoring data, the first visual representation generated based on a first visual framework including non-transitory computer-readable instructions defining a predetermined first location in the second portion of the web-based GUI for displaying the at least one first device of the first mechanical industrial machine and a predetermined second location in the second portion of the web-based GUI for displaying the first device data associated with at least one first device of the first mechanical industrial machine;
displaying, within the second portion of the web-based GUI, the first visual representation at the predetermined first and second locations;
receiving data characterizing a second user selection of a second interactive graphical object associated with a second mechanical industrial machine at a second industrial site remote from the first industrial site, the second interactive graphical object selected from a second plurality of interactive graphical objects corresponding to a plurality of mechanical industrial machines at the second industrial site, the second plurality of interactive graphical objects provided via the first portion of the web-based GUI,
retrieving second monitoring data associated with the second mechanical industrial machine from a second monitoring system configured to monitor the second mechanical industrial machine, wherein the second monitoring data comprises second device data associated with at least one second device of the second mechanical industrial machine;
generating a second visual representation of the second mechanical industrial machine in the second portion of the web-based GUI, wherein the second visual representation includes the at least one second device of the second mechanical industrial machine and the second monitoring data, the second visual representation generated based on a second visual framework including non-transitory computer-readable instructions defining the predetermined first location in the second portion of the web-based GUI for displaying the at least one second device of the first mechanical industrial machine and the predetermined second location in the second portion of the web-based GUI for displaying the first device data associated with at least one first device of the first mechanical industrial machine; and
displaying, in the second portion of the web-based GUI, the second visual representation at the predetermined first and second locations of the web-based GUI.

2. The method of claim 1, further comprising selecting the first visual framework from a plurality of visual frameworks based on a first identifier characteristic associated with the first mechanical industrial machine, wherein each visual framework of the plurality of visual frameworks is associated with an identifier characteristic.

3. The method of claim 2, wherein the second portion of the web-based GUI includes a plurality of visualizations associated with a plurality of components of the first mechanical industrial machine and/or the second mechanical industrial machine, wherein the plurality of visualizations are arranged at predetermined locations.

4. The method of claim 1, wherein the second portion of the web-based GUI further includes a first graphical object including a first identifier associated with a first component of the at least one first device of the first mechanical industrial machine, and/or a second graphical object including a first sensor measurement associated with the first component of the at least one first device of the first mechanical industrial machine, wherein a second location of the first graphical object and/or a third location of the second graphical object is included in the first visual framework.

5. The method of claim 1, further comprising:
receiving an update to the first monitoring data associated with the first mechanical industrial machine, wherein the first monitoring data associated with the first mechanical industrial machine is updated via a first GUI associated with the first monitoring system; and
updating the second portion of the web-based GUI based on the received update.

6. The method of claim 1, wherein the web-based GUI is generated by an enterprise monitoring system configured to communicate with the first monitoring system and the second monitoring system.

7. The method of claim 1, wherein the first device of the first mechanical industrial machine or the second device of the second mechanical industrial machine is a motor, a gearbox, or a compressor.

8. A system comprising:
at least one data processor; and
memory coupled to the at least one data processor, the memory storing instructions to cause the at least one data processor to perform operations comprising:
receiving data characterizing a first user selection of a first interactive graphical object associated with a first mechanical industrial machine at a first industrial site, the first interactive graphical object selected from a first plurality of interactive graphical objects associated with a plurality of mechanical industrial machines at the first industrial site, the first plurality of interactive graphical objects provided via a first portion of a web-based graphical user interface (GUI);
retrieving first monitoring data associated with the first mechanical industrial machine from a first monitoring system configured to monitor the first mechanical industrial machine, wherein the first monitoring data comprises first device data associated with at least one first device of the first mechanical industrial machine;
generating a first visual representation of the first mechanical industrial machine in the second portion of the web-based GUI, wherein the first visual representation includes the at least one first device of the first mechanical industrial machine and the first monitoring data, the first visual representation generated based on a first visual framework including non-transitory computer-readable instructions defining a predetermined first location in the second portion of the web-based GUI for displaying the at least one first device of the first mechanical industrial machine and a predetermined second location in the second portion of the web-based GUI for displaying the first device data associated with at least one first device of the first mechanical industrial machine;
displaying, within the second portion of the web-based GUI, the first visual representation at the predetermined first and second locations;
receiving data characterizing a second user selection of a second interactive graphical object associated with a second mechanical industrial machine at a second industrial site remote from the first industrial site, the second interactive graphical object selected from a second plurality of interactive graphical objects corresponding to a plurality of mechanical industrial machines at the second industrial site, the second plurality of interactive graphical objects provided via the first portion of the web-based GUI;
retrieving second monitoring data associated with the first mechanical industrial machine from a first monitoring system configured to monitor the first mechanical industrial machine, wherein the second monitoring data comprises second device data associated with at least one second device of the second industrial machine;
generating a second visual representation of the second mechanical industrial machine in the second portion of the web-based GUI, wherein the second visual representation includes the at least one second device of the second mechanical industrial machine and the second monitoring data, the second visual representation generated based on a second visual framework including non-transitory computer-readable instructions defining the predetermined first location in the second portion of the web-based GUI for displaying the at least one second device of the first mechanical industrial machine and the predetermined second location in the second portion of the web-based GUI for displaying the first device data associated with at least one first device of the first mechanical industrial machine; and
displaying, in the second portion of the web-based GUI, the second visual representation at the predetermined first and second locations of the web-based GUI.

9. The system of claim 8, wherein the operations further comprising selecting the first visual framework from a plurality of visual frameworks based on a first identifier characteristic associated with the first mechanical industrial machine, wherein each visual framework of the plurality of visual frameworks is associated with an identifier characteristic.

10. The system of claim 9, wherein the second portion of the web-based GUI includes a plurality of visualizations associated with a plurality of components of the first mechanical industrial device and/or the second mechanical industrial device, wherein the plurality of visualizations are arranged at predetermined locations.

11. The system of claim 8, wherein the second portion of the web-based GUI further includes a first graphical object including a first identifier associated with a first component of the at least one first device of the first mechanical industrial machine, and/or a second graphical object including a first sensor measurement associated with the first component of the at least one first device of the first mechanical industrial machine, wherein a second location of the first graphical object and/or a third location of the second graphical object is included in the first visual framework.

12. The system of claim 8, wherein the operations further comprising:
receiving an update to the first monitoring data associated with the first mechanical industrial machine, wherein the first monitoring data associated with the first mechanical industrial machine is updated via the first monitoring system; and updating the second portion of the web-based GUI based on the received update.

13. The system of claim 8, wherein the web-based GUI is generated by an enterprise monitoring system configured to communicate with the first monitoring system and the second monitoring system.

14. A computer program product comprising a non-transitory machine-readable medium storing instructions that, when executed by at least one programmable processor that comprises at least one physical core and a plurality of logical cores, cause the at least one programmable processor to perform operations comprising:

receiving data characterizing a first user selection of a first interactive graphical object associated with a first mechanical industrial machine at a first industrial site, the first interactive graphical object selected from a first plurality of interactive graphical objects associated with a plurality of mechanical industrial machines at the first industrial site, the first plurality of interactive graphical objects provided via a first portion of a web-based graphical user interface (GUI);

retrieving first monitoring data associated with the first mechanical industrial machine from a first monitoring system configured to monitor the first mechanical industrial machine, wherein the first monitoring data comprises first device data associated with at least one first device of the first mechanical industrial machine;

generating a first visual representation of the first mechanical industrial machine in the second portion of the web-based GUI, wherein the first visual representation includes the at least one first device of the first mechanical industrial machine and the first monitoring data, the first visual representation generated based on a first visual framework including non-transitory computer-readable instructions defining a predetermined first location in the second portion of the web-based GUI for displaying the at least one first device of the first mechanical industrial machine and a predetermined second location in the second portion of the web-based GUI for displaying the first device data associated with at least one first device of the first mechanical industrial machine;

displaying, within the second portion of the web-based GUI, the first visual representation at the predetermined first and second locations;

receiving data characterizing a second user selection of a second interactive graphical object associated with a second mechanical industrial machine at a second industrial site remote from the first industrial site, the second interactive graphical object selected from a second plurality of interactive graphical objects corresponding to a plurality of mechanical industrial machines at the second industrial site, the second plurality of interactive graphical objects provided via the first portion of the via the first portion of the web-based GUI;

retrieving second monitoring data associated with the first mechanical industrial machine from a first monitoring system configured to monitor the first mechanical industrial machine, wherein the second monitoring data comprises second device data associated with at least one second device of the second mechanical industrial machine;

generating a second visual representation of the second mechanical industrial machine, wherein the second visual representation includes the at least one second device of the second mechanical industrial machine and the second monitoring data, the second visual representation generated is based on a second visual framework including non-transitory computer-readable instructions defining the predetermined first location in the second portion of the web-based GUI for displaying the at least one second device of the first mechanical industrial machine and the predetermined second location in the second portion of the web-based GUI for displaying the first device data associated with at least one first device of the first mechanical industrial machine associated with a first identifier characteristic of the second mechanical industrial machine; and displaying, in the second portion of the web-based GUI, the second visual representation at the predetermined first and second locations of the web-based GUI.

15. The computer program product of claim 14, wherein the operations further comprising selecting the first visual framework from a plurality of visual frameworks based on a first identifier characteristic associated with the first mechanical industrial machine, wherein each visual framework of the plurality of visual frameworks is associated with an identifier characteristic.

16. The computer program product of claim 15, wherein the second portion of the web-based GUI includes a plurality of visualizations associated with a plurality of components of the first mechanical industrial machine and/or the second mechanical industrial machine, wherein the plurality of visualizations are arranged at predetermined locations.

17. The computer program product of claim 14, wherein the second portion of the web-based GUI further includes a first graphical object including a first identifier associated with a first component of the at least one first device of the first mechanical industrial machine and/or a second graphical object including a first sensor measurement associated with the first component of the at least one first device of the first mechanical industrial machine, wherein a second location of the first graphical object and/or a third location of the second graphical object is included in the first visual framework.

18. The computer program product of claim 14, wherein the operations further comprising:

receiving an update to the first monitoring data associated with the first mechanical industrial machine, wherein the first monitoring data associated with the first mechanical industrial machine is updated via the first monitoring system; and updating the second portion of the web-based GUI based on the received update.

19. The computer program product of claim 14, wherein the web-based GUI is generated by an enterprise monitoring system configured to communicate with the first monitoring system and the second monitoring system.

* * * * *